United States Patent [19]
Schwarzschild

[11] 3,818,690
[45] June 25, 1974

[54] STEPPING MOTOR FOR WATCH MOVEMENT

[75] Inventor: Gunter J. Schwarzschild, Stamford, Conn.

[73] Assignee: Timex Corporation, Waterbury, Conn.

[22] Filed: Nov. 21, 1973

[21] Appl. No.: 417,997

[52] U.S. Cl.................................. 58/23 D, 310/49
[51] Int. Cl............................................ G04c 3/00
[58] Field of Search............ 58/23 A, 23 BA, 23 D; 310/49, 168

[56] References Cited
UNITED STATES PATENTS
3,539,845  11/1970  Stcherbatcheff.................. 58/23 R
3,731,125  5/1973  Nikaidu et al....................... 310/49

Primary Examiner—Edith Simmons Jackmon

[57] ABSTRACT

A single phase reluctance stepping motor suitable for driving a time indicating gear train in a watch which incorporates a detent for holding the rotor of the stepping motor in a stable position and a timed pulse generator providing DC pulses of sufficient duration to advance the rotor from one stable position to the next.

4 Claims, 3 Drawing Figures

PATENTED JUN 25 1974 3,818,690
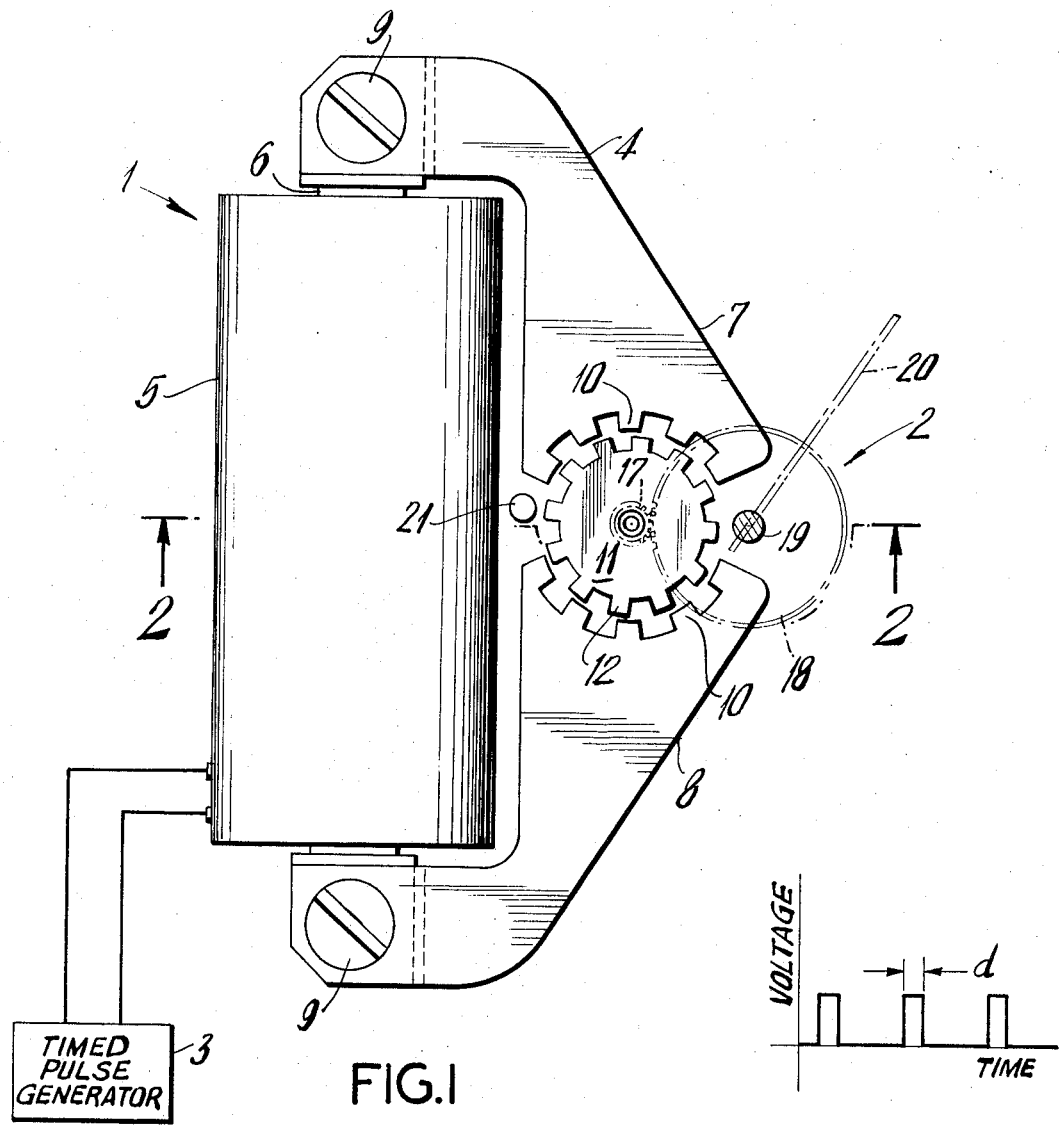
FIG.1
FIG.3
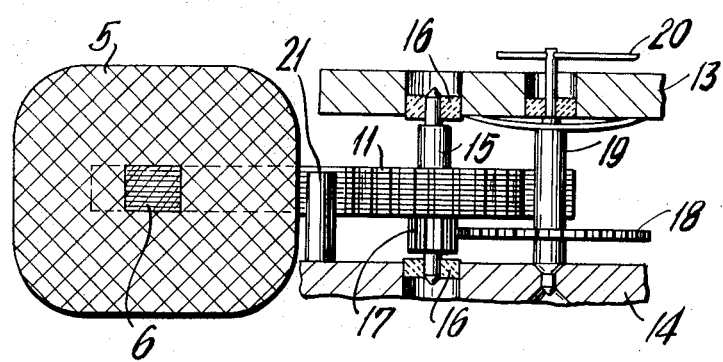
FIG.2

STEPPING MOTOR FOR WATCH MOVEMENT

BACKGROUND OF THE INVENTION

This invention relates generally to a stepping motor suitable for a horological device, and more particularly to a single phase reluctance-type stepping motor for a time indicating gear train which is efficient and consumes relatively little power.

Stepping motors have been known in the art for horological devices and other uses employing permanent magnet rotors such as disclosed in U.S. Pat. No. 3,597,915 issued to Aizawa on Aug. 10, 1971; U.S. Pat. No. 3,370,189 issued to Haydon et. al. on Feb. 20, 1968; and U.S. Pat. No. 3,596,119 issued to Goldmann on July 27, 1971. Such permanent magnet stepping motors are known to be less efficient than reluctance type stepping motors due to losses from reversing flux and requirements for alternating current pulses.

Reluctance stepping motors are known in the art of more complicated construction which use polyphase windings such as U.S. Pat. No. 2,627,040 issued to Hansen on Jan. 27, 1953 or requiring mechanically actuated accessories such as in U.S. Pat. No. 3,159,759 to Conrad et al. issued Dec. 1, 1964.

Detent means have been used in conjunction with permanent magnet stepping motors such as in the aforementioned Aizawa patent, or for use in positioning continuously rotating reluctance motors for starting, as in U.S. Pat. No. 2,867,762 to Lehman et al. issued Jan. 6, 1959.

All of the foregoing prior art devices suffer from complicated constructions or relatively high power consumption. It is highly desirable for a small horological device such as an electronic watch to have an extremely simple and efficient stepping motor.

SUMMARY OF THE INVENTION

Briefly stated, the invention comprises a stepping motor with a single phase stator winding on a laminated core of a temporarily magnetic material connected to oppositely disposed pole pieces with uniformly spaced teeth, a rotor or temporarily magnetic material with uniformly spaced teeth disposed between the pole pieces to form an air gap, a detent, preferably a permanent magnet, cooperating with the rotor to hold it in a stable position with the rotor teeth positioned for unidirectional rotation when the winding is energized, a time indicating gear train driven by the rotor, and a timed pulse generator supplying pulses to the winding of sufficient duration to initiate rotation by one tooth pitch to the next stable position.

One object of the present invention is to provide an improved stepping motor for a horological device which is of the reluctance type so as to utilize less power and to be more efficient.

Another object of the invention is to provide an improved reluctance stepping motor and detent arrangement which is simple to construct and economical to manufacture.

DRAWING

These and many other objects of the invention will be more clearly understood by reference to the following description taken in connection with the appended drawing in which:

FIG. 1 is a plan view of the stepping motor with schematic representation of the pulse generator and time indicating gear drive, FIG. 2 is an elevation view, in section, of the stepping motor, FIG. 3 is a graph of a pulse train applied to the stepping motor.

DESCRIPTION OF THE PREFERRED EMBODIMENT

Referring to FIG. 1 of the drawing, a stepping motor, shown generally at 1 is arranged to drive a time indicating gear train shown generally at 2 in response to timed DC pulses from a timed pulse generator 3.

The stepping motor comprises a stator 4 made up of a single phase winding 5 disposed on a core 6 attached to oppositely disposed pole pieces 7, 8. The core 6 and pole pieces 7, 8 are connected by suitable fasteners such as screws 9, and are made up of stacked laminations of temporarily magnetizable material such as soft iron. Pole pieces 7, 8 each are provided with uniformly spaced teeth 10.

A rotor 11 is also made up of temporarily magnetizable material, such as soft iron and preferably is formed from laminations or punchings and is formed with uniformly spaced teeth 12 with the same tooth pitch as stator teeth 10.

Referring to the cross section of FIG. 2, rotor 11 is rotatably mounted between bridge members 13, 14 on a spindle 15 carried in suitable bearings 16. Means are provided for the rotor to drive a time indicating gear train symbolically illustrated by a pinion 17 driving a gear 18 on a staff 19 with an attached sweep hand 20. It will be understood that normally a train of gears (not shown) is required to indicate seconds, minutes, and hours in a conventional fashion.

A detent device comprising a permanent magnet 21 is disposed between the pole pieces adjacent one of the teeth 12 of the rotor to hold it in a stable position between pulses. Magnet 21 is located off-center so that in the rest position, rotor teeth 12 are not aligned with stator teeth 10 but partially cover the stator teeth and partially extend into the space between the stator teeth.

The timed pulse generator 3 may be of any conventional construction suitable for supplying precisely timed DC pulses to winding 5. The pulse frequency should be such as to drive the time indicating gear train to indicate time with the desired degree of accuracy. For example, pulse generator 3 can include a quartz oscillator with frequency reduced by the plurality of binary dividing stages, and a trigger circuit for initiating pulses of predetermined duration. Many other types of pulse generators can be employed, a suitable pulse generator being shown in U.S. Pat. No. 3,566,601 issued to Shrady on Mar. 2, 1971, which is incorporated herein by reference.

The pulse train generated is shown in FIG. 3. The duration $d$ of the pulses must be precisely determined in accordance with the friction and inertia of the rotating system and the influence of the detent magnet 21. The pulses must be of sufficient duration to initiate rotation against the influence of magnet 21 and the inertia of the system, but not of such great duration that they cause the rotor teeth to become locked as they pass the stator teeth. When the pulse stops, the rotor inertia carries it on to the next stable position.

The operation of the above described stepping motor should be readily apparent. When a pulse is initiated, the rotor 11 seeks to advance in one direction so as to maximize the magnetic field energy, by presenting the lowest magnetic reluctance path through the rotor, i.e., rotor and stator teeth aligned. The magnitude of voltage times pulse duration is such as to impart sufficient energy to the rotor to overcome the friction, energy and detenting torque encountered in one step of rotation. The voltage pulse ends before the rotor has completed one tooth pitch of travel. The rotor is pulled to its next stable rest position between magnetic detent 21 and awaits the next pulse.

Thus, there has been described what is considered to be the preferred embodiment of the invention, and it is desired to secure in the appended claims all such modifications as fall within the true spirit and scope of the invention.

What I claim is:

1. In a horological device, the combination of:
a reluctance-type stepping motor comprising;
 a. a single phase stator winding disposed on a core comprising laminations of temporarily magnetizable material and having oppositely disposed pole pieces defining circumferentially spaced teeth of uniform pitch thereon,
 b. a rotor of temporarily magnetizable material having uniformly spaced teeth of the same pitch as said stator teeth and forming an air gap therewith,
 c. detent means arranged to position said rotor in a stable position with the rotor teeth extending into the spaces between stator teeth so as to initiate unidirectional rotation when said winding is energized, a time indicating gear train driven by said rotor, and a timed pulse generator connected to supply DC pulses to said winding of sufficient duration to initiate rotation of said rotor and to cause the rotor to advance by one tooth pitch to the next stable position and to be arrested by said detent means.

2. The combination according to claim 1, wherein said rotor is comprised of soft iron laminations.

3. The combination according to claim 1, wherein said detent means comprises a permanent magnet disposed adjacent the rotor periphery and performing a detenting action with successive teeth of the rotor.

4. The combination according to claim 1, wherein said detent means comprises a permanent magnet disposed between the pole pieces and forms an air gap with successive rotor teeth.

* * * * *